US006405976B1

(12) United States Patent
Jacoby (10) Patent No.: US 6,405,976 B1
(45) Date of Patent: Jun. 18, 2002

(54) COUNTER-ROTATION DISC LIFT DEVICE

(76) Inventor: Paul Jacoby, 648 Kansas St., Edwardsville, IL (US) 62025

( * ) Notice: Subject to any disclaimer, the term of this patent is extended or adjusted under 35 U.S.C. 154(b) by 0 days.

(21) Appl. No.: 09/597,676

(22) Filed: Jun. 20, 2000

(51) Int. Cl.$^7$ ................................................. B64C 3/00
(52) U.S. Cl. ...................... 244/34 R; 244/62; 244/73 R
(58) Field of Search ................................. 244/34 R, 39, 244/62, 12.2, 23 C, 34 A, 8, 1 R, 17.23, 17.19, 73 R, 73 B (56) References Cited

U.S. PATENT DOCUMENTS

| | | | | |
|---|---|---|---|---|
| 3,181,811 A | * | 5/1965 | Maksim, Jr. .................. | 244/12 |
| 3,628,755 A | | 12/1971 | Nagler ..................... | 244/17.21 |
| 3,831,884 A | * | 8/1974 | Schellin ..................... | 244/12 C |
| 3,883,266 A | | 5/1975 | Soulant, Jr. .................... | 416/1 |
| 4,202,518 A | | 5/1980 | Burnham et al. .......... | 244/73 C |
| 4,301,981 A | * | 11/1981 | Hartt ......................... | 244/12.2 |
| 4,386,748 A | * | 6/1983 | Jordan ....................... | 244/12.2 |
| 4,387,867 A | * | 6/1983 | Jordan ....................... | 244/12.2 |
| 4,913,376 A | * | 4/1990 | Black ............................ | 244/8 |
| 5,072,892 A | * | 12/1991 | Carrington ................ | 244/23 C |
| 5,167,384 A | | 12/1992 | Krepak .................... | 244/17.21 |
| 5,203,521 A | | 4/1993 | Day .......................... | 244/12.2 |
| 5,932,940 A | * | 8/1999 | Epstein et al. ......... | 310/40 MM |

FOREIGN PATENT DOCUMENTS

| | | | | |
|---|---|---|---|---|
| AU | 65702 | 1/1914 | ............... | 244/23 R |
| DE | 2335220 | 1/1975 | ............... | 244/23 C |
| GB | 1485359 | 9/1977 | ............... | 244/73 C |

* cited by examiner

Primary Examiner—Charles T. Jordan
Assistant Examiner—Gabriel S Sukman
(74) Attorney, Agent, or Firm—Don W. Weber (57) ABSTRACT

A lift and propulsion device is presented which utilizes Bournelli's Principle and the principle of relative motion to create lift. A series of discs are arranged in coaxial alignment. Each successive disc rotates in a direction opposite from the direction of rotation of the disc above it. Air is introduced at the lower outer circumferential surface of the first disc. The introduction of air at this point, as well as the relative motion of the counter-rotating surfaces between the first and second discs creates a large amount of lift. Air is introduced onto the opposite outer circumferential lower surface of the second disc, in the direction of rotation of the second disc. The introduction of this air creates a large amount of lift between Discs B and C. Each successive disc rotates in an opposite direction from the disc above it and has air interjected onto the lower circumferential surface of that disc in the direction of rotation of the disc. This series of counter-rotating discs and air injection creates a large amount of lift for the device. The device is fully enclosed and may be utilized for a lift or propulsion mechanism in many varying applications.

3 Claims, 6 Drawing Sheets

COUNTER-ROTATION DISC LIFT DEVICE

BACKGROUND OF THE INVENTION

This invention relates to the field of aerodynamic lift and propulsion. More particularly, a new type of lift device is disclosed utilizing counter-rotating discs and air injection.

Since the discovery of flight by the Wright Brothers, much attention has been given in the scientific field to the development of better types of aircraft. From the initial beginning of the single engine winged aircraft, driven by a standard internal combustion engine, jet airplanes and helicopters have been developed. This particular invention relates generally to the field involving helicopters, or devices which create lift by means of a rotating blade.

Aerodynamic lift is a phenomenon which allows heavier than air flight. Lift/propulsion devices such as helicopter rotors and aircraft propellers create a pressure differential between the surfaces of the propeller or rotor, and thus create lift or propulsion of an aircraft. Helicopter rotors in particular are generally single rotor devices, with the lift created when the propeller turns in a circular motion. The lift is created when the pressure on the top of the helicopter rotor becomes less than the pressure on the bottom of the helicopter rotor due to the rapid rotation of the rotors.

The same principles utilized in helicopters are utilized in this particular invention. However, it is an object of this invention to increase the lift of a rotating device by replacing the helicopter rotor with a disc.

In addition to increasing the lift when a disc rather than a helicopter rotor is used, lift may also be increased when air is injected underneath the rotating disc in the same direction as the direction of rotation of the bottom surface of the disc. It is another object of this invention to increase the lift of a rotating disc by injecting air onto the lower surface of the disc.

Yet another way to increase the lift is to position a number of rotating discs in coaxial alignment, with each disc rotating in the direction opposite from the direction of rotation of the disc above. When there discs are so positioned and rotate in alternating opposite directions, the lift provided by a series of such discs, when air is also injected at the circumference of each disc in an alternative fashion, creates greater lift. It is a still further object of this invention to provide a number of counter-rotating discs, with air injected at the circumference of each disc in order to further increase the lift of the device.

At least one prior patent has addressed the efficient and efficacious use of counter-rotating discs to enhance the lift of a device. The 1992 patent issued to Krepak, U.S. Pat. No. #5,167,384, recognizes the benefits of having first and second coaxial counter-rotating discs which increase the velocity of air moving across the actual primary lift airfoil blades. Krepak's invention does recognize the principle that passing velocities combine to accelerate the velocity of the air stream over the primary lift airfoil thus increasing lift. However, Krepak does not carry that principle one step forward by combining a number of counter-rotating discs along with the injection of air at the circumference of the disc to greatly enhance the lift of a composite device. It is a still further object of this invention to provide a lift device which utilizes the principles previously known in the field but improves upon both the structure and introduction of air velocity to increase the overall lift of an efficient unit.

Another patent of general interest is the 1977 British patent #1,485,359, issued to Brown. The Brown patent also has rotating discs and air introduced and re-circulated. However, the Brown patent does not rely on the concept of relative motion to create lift or propulsion as does the instant invention.

Further and other objects of this invention will become obvious upon reading the below described Specification.

BRIEF DESCRIPTION OF THE INVENTION

The instant invention combines the concept of relative motion and Bournelli's Principle by arranging a group of coaxial discs and counter-rotating the discs successively. By injecting fluid between the discs at each circumferential edge and between the discs, so that the fluid is always moving with the lower side and opposite the upper side of each disc, lift is created. The fluid comes in at the outer circumferential edge of the disc and exits at the center of the disc.

The invention involves a number of flat counter-rotating discs arranged in an axial configuration. Each disc has a space between the disc beneath it and each disc has a central airshaft. While the discs rotate in opposite directions, respectively, air is also injected at the bottom circumference of each disc in order to enhance the lift properties of the entire device. As air is injected onto the lower surface of the upper Disc A, a pressure differential between the top surface of Disc A and the lower surface is created. This pressure differential creates lift on the upper Disc A. Air injected on the lower surface of the next lower counter-rotating disc also creates a pressure differential and creates a lift on Disc B. The next lower disc has air injected in the same direction as Disc A, and lift is created by the injection of air and the rotation of the disc. A series of discs may be combined to create a large amount of lift for the device. A drive mechanism for the discs as well as the air blower, air inlets and airshafts complete the device.

BRIEF DESCRIPTION OF THE DRAWING FIGURES

FIG. 1 is a cross-sectional view of the device showing the intact blower motor and the discs. FIG. 1 shows air as it is introduced between the first and second discs.

DETAILED DESCRIPTION OF THE PREFERRED EMBODIMENT

This invention replaces lift/propulsion devices with a more efficient unit utilizing counter-rotating discs and the introduction of air at the circumference of each disc. The device functions as a result of well-known scientific principles, including Bournelli's Principle involving fluid motion. The device comprises a number of rotating discs, 4, 5, and 6, as shown on Drawing FIGS. 1 and 2. Each disc rotates in a direction opposite from the disc directly above or below it.

Figure 3:
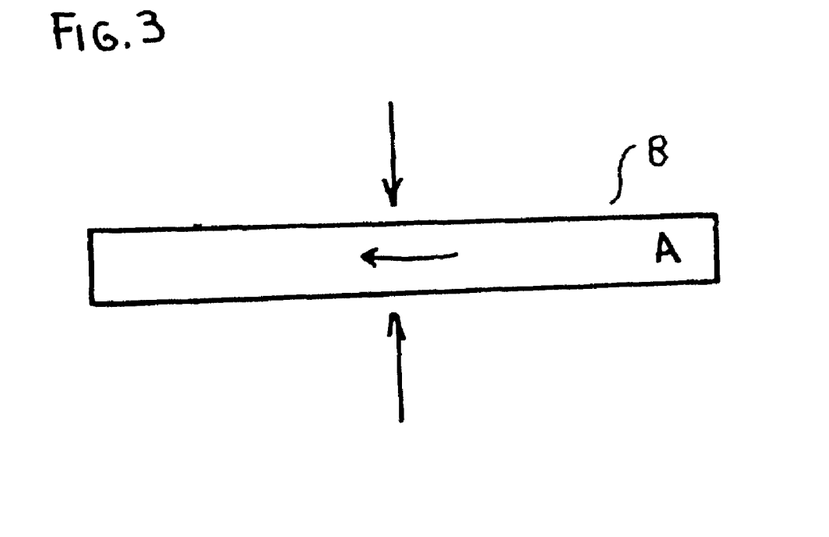
FIG. 3 is a schematic view of a rotating disc showing the normal pressure on the upper and lower surfaces.

This invention converts the force of a rotating disc into linear lift. The vertical linear lift is created by a combination of Bournelli's Principle and the concept of relative motion. The creation of this vertical lift is best shown on FIGS. 3 and 4. As shown on FIG. 3, given a Disc A, the pressure on the upper and lower surfaces of a non-rotating disc would be approximately equal to air pressure of 14.7 psi. However, when the disc shown on FIG. 3 is rotated in the direction of the arrow shown on the body of Disc A, the pressure on the upper and lower surfaces would be reduced by 0.7 psi to approximately 14 psi. (It is to be understood that these psi pressures are for illustration only and are not exact measured pressures.) Because pressure is reduced equally on the upper and lower surfaces of the rotating disc, there would not be any vertical lift created.

Figure 4:
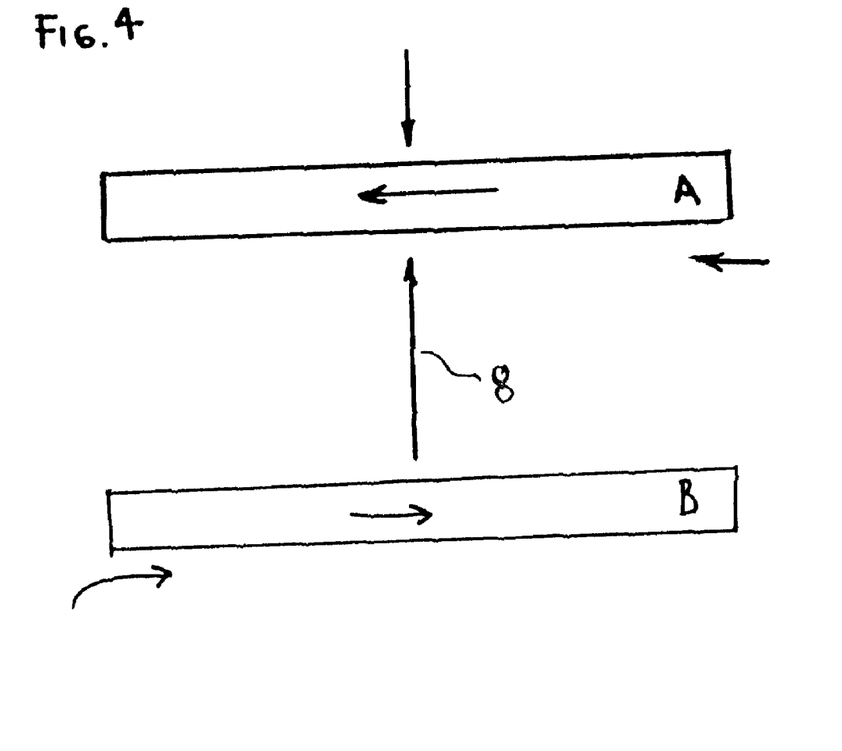
FIG. 4 is a schematic view of a rotating disc, with air injected in the direction of the rotation of the discs at its lower side.
Figure 5:
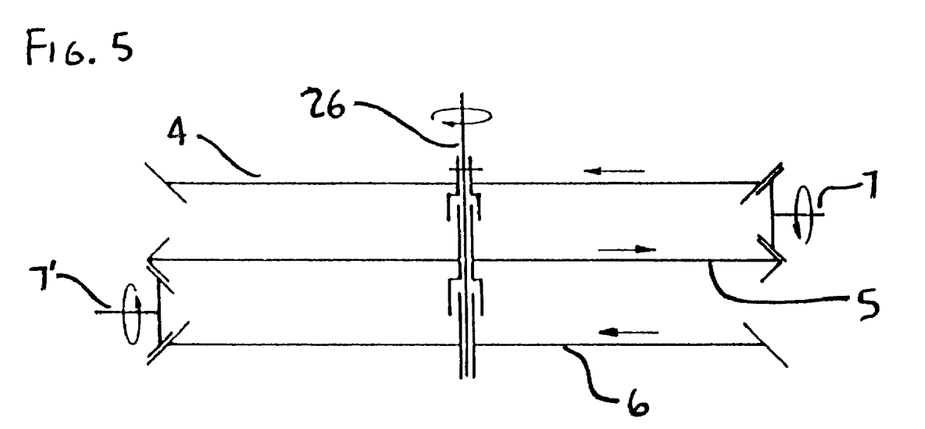
FIG. 5 is a schematic view of the discs showing the direction of the rotation.

However, as shown on FIG. 4, when air is injected at the circumferential edge of Disc A, as shown by the arrow, and in the direction of the arrow, a difference in air pressure will be created. For example, as shown schematically in FIG. 4, the pressure on the upper surface of Disc A would be approximately 14 psi (since no air is introduced onto that upper surface). At the same time, the pressure on the lower surface of Disc A would be approximately 14.7 psi. The introduction of the air at the bottom circumferential edge of the disc has thus equalized the pressure on the rotating Disc A such that a lift differential of 0.7 psi (approximate) would be created. It is this pressure differential created by the injection of air at the circumferential lower edge which adds lift to the disc and thus to the device as a whole.

When using a series of counter-rotating discs, and alternately introduced circumferential air, the lift effect is magnified. Air injected at the circumferential edge along the lower circumference of Disc A would also cause the pressure to change on another disc that is below Disc A. On the lower disc, the upper surface will have a pressure lower than that of normal atmospheric pressure (14.7 psi) due to the rotation of the disc. The injection of air at the circumferential edges between Disc A and a lower Disc B would further reduce the pressure on the upper surface of Disc B since this air is introduced in a direction opposite from direction of rotation of Disc B. This would create, for example, 13.5 psi of pressure on the upper surface of Disc B. When air is introduced onto the lower surface of Disc B, at the circumferential edge, in the direction shown, the pressure on the lower surface of Disc B would be increased to, for example, 14.7 psi. This creates 1.2 psi of lift on Disc B (14.7−13.5+1.2). The total lift created would then be 1.2 from Disc B plus 0.7 from Disc A or 1.9 psi of lift. Similarly, the introduction of air in alternating directions on a lower third disc would create a similar 1.2 lift differential. The total lift would then be 1.2 plus 1.2 plus 0.7 equals 3.1 psi. By increasing the number of discs, the amount of lift is increased and the vertical lift of the entire device would be enhanced.

It should be noted that the numbers, used here are for illustration only and are not exact mathematical simulations. The actual lift obtained from this device is much more than the lift obtained from the standard helicopter rotors. However, the numerical values measured in psi here are given as a means of illustration only and are not meant to be an exact mathematical calculation of the amount of lift involved.

Figure 1:
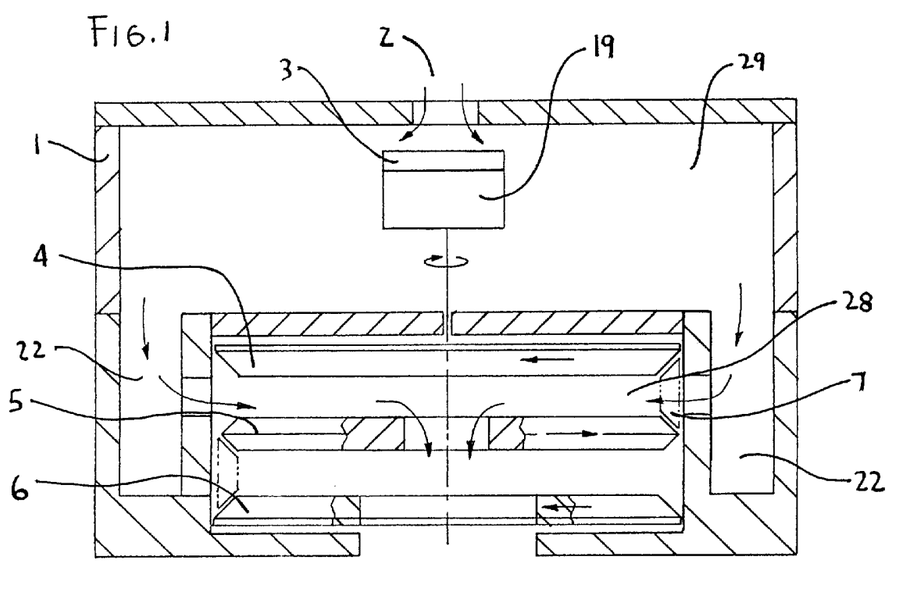
Figure 2:
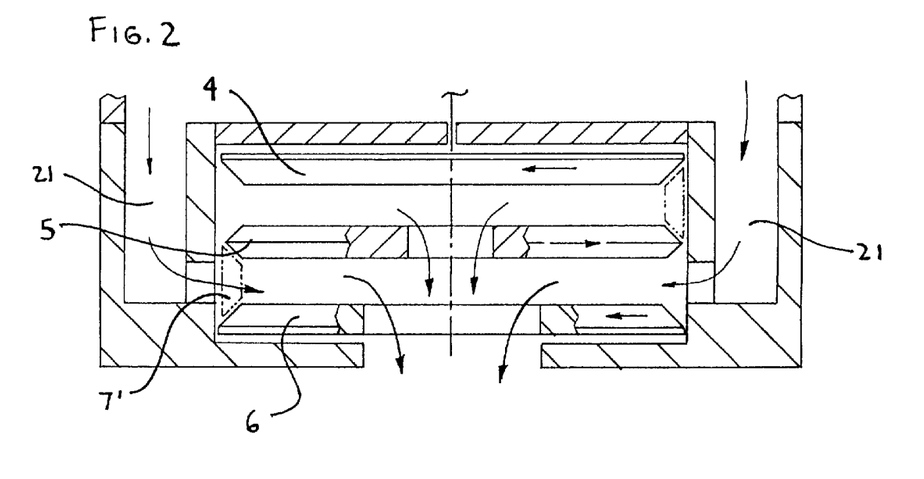
FIG. 2 is a cross-sectional view of the device as shown on FIG. 1, showing the direction of airflow particularly between disc 5 and disc 6.

Turning now to FIG. 1, a device utilizing the above described aerodynamic principles is illustrated. The device includes an outer case 1 having an air inlet port 2 central to the outer case. Located near the central inlet port 2 is a blower motor 3 and a disc drive motor 19. The blower motor 3 takes in air from the inlet port and pushes it through the clockwise airshafts 21 and counter-clockwise airshafts 22. These airshafts are described later.

Located within a series of levels are rotating discs. It is to be understood that this invention may embody any number of rotating discs. However, for purposes of illustration, this preferred embodiment will describe three discs, an upper disc 4, a middle disc 5 and a lower disc 6. All three discs are located within the disc plenum chamber 28, as best shown on FIG. 1. Disc chamber 28 is aerodynamically connected to the outer case chamber 29 by means of passageways to be described.

Figure 13:
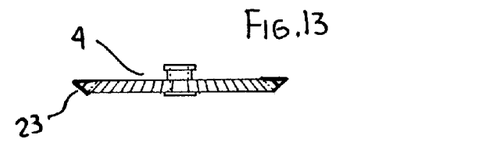
FIG. 13 is a side view of the upper disc.
Figure 13A:
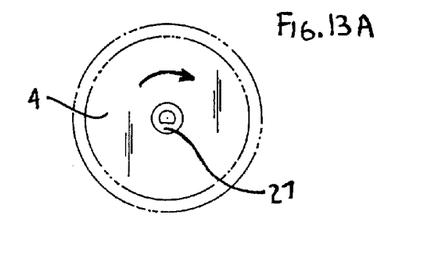
FIG. 13A is a top view of the upper disc.
Figure 14:
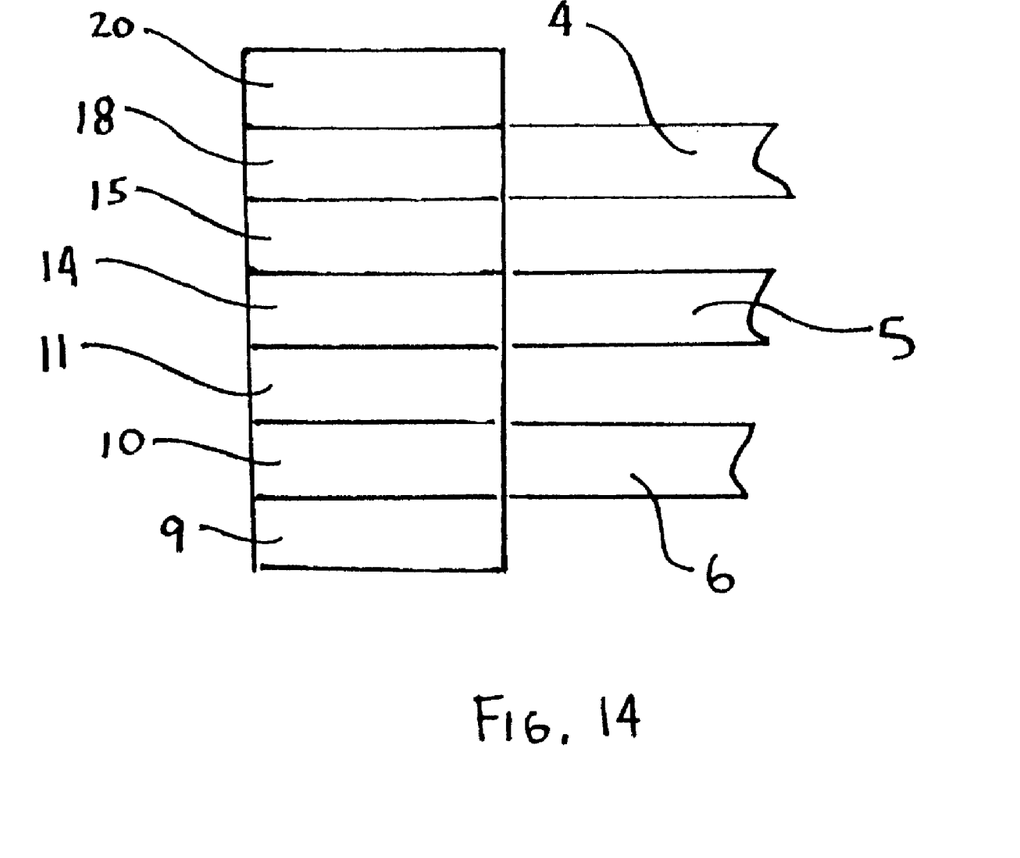
FIG. 14 is a partial side view cutaway view of the various levels shown on FIGS. 1 through 12.

The upper disc 4 is mechanically connected to the disc drive motor 19 by means of the drive shaft 26. It is this upper disc that is driven directly by the motor. The upper disc 4, as best shown on FIGS. 13 and 14, is connected to the drive shaft 26 by means of the upper disc key 27. The upper disc 4 is geared and beveled as shown on FIG. 13. The upper disc has a downward bevel 23, which is mechanically connected to a first reversing gear 7 as shown on FIG. 1. The middle disc 5, as best shown on FIGS. 11A and 11B, also has middle disc central aperture cutouts 17, as best shown on FIG. 11B. These central apertures on the middle disc allow for airflow through the center of the disc axial alignment. The middle disc 5 has a geared and dual bevel 24 as best shown on FIG. 11A. The upper bevel 24 is mechanically connected to the upper reversing gear 7 and ultimately to the lower reversing gear 7'.

Figure 9:
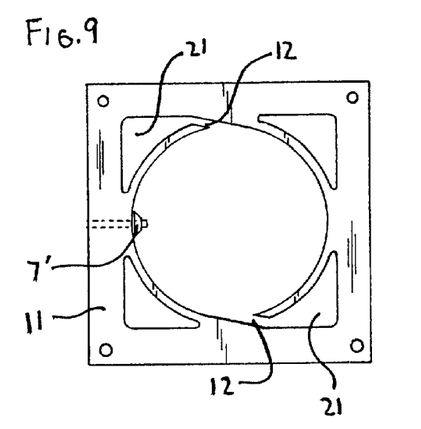
FIG. 9 is a plan view of the lower disc circumferential level showing the circumferential apertures.
Figure 9A:
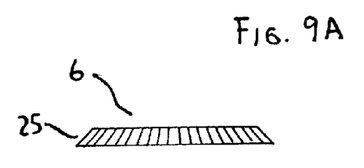
FIG. 9A is a side view of the lower disc.
Figure 9B:
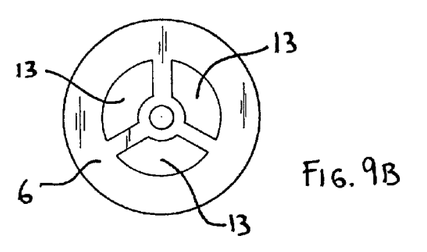
FIG. 9B is a top view of the lower disc.

The lower disc 6 is best shown on FIGS. 9A and 9B. Lower disc 6 is geared and beveled as shown on FIG. 9A. This lower gear has an upper bevel 25 which is gearedly connected to the lower reversing gear 7' as best shown on FIGS. 1 and 2. When the motor drives the upper disc 4, the series of gears, bevels and reversing gears, in turn would drive each lower disc in an opposite direction, as shown by the horizontal arrows on each disc in Drawing FIGS. 1 and 2.

Two of these discs are shown schematically on FIG. 4. The upper disc 4 is shown schematically as Disc A while the middle disc is shown as Disc B. As can be seen schematically, lift 8 is created by the counter-rotating discs and circumferential introduction of air. This lift is similar to the lift found on helicopter or other aerodynamic device.

A partial view of the levels and discs located in the disc chamber 28 is shown on FIG. 14. This disc chamber 28 comprises a number of levels which are used to introduce air at the circumferential edge of each disc, as appropriate, and to allow the air to circulate through the central apertures of the discs themselves.

Figure 7:
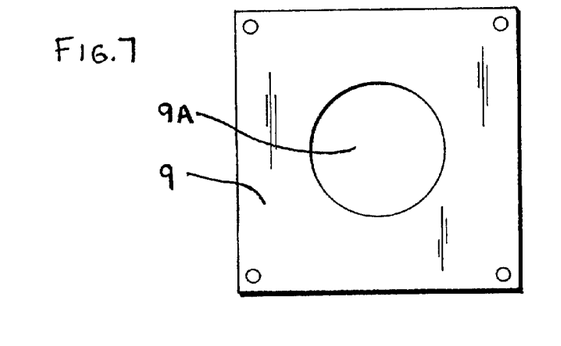
FIG. 7 is a planed view of the bottom exit level and aperture.
Figure 7A:
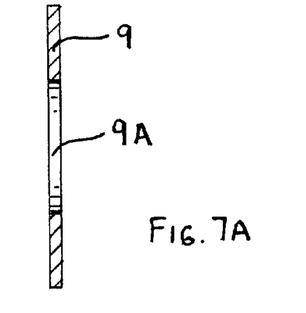
Figure 8:
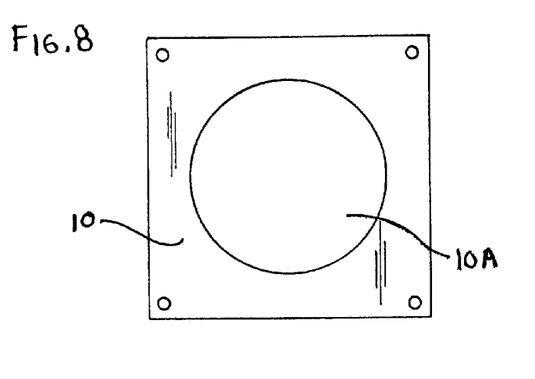
FIG. 8 is a plan view of the large exit level.
Figure 8A:
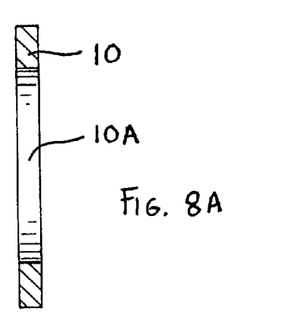

A bottom exit level 9, also shown on FIG. 7, has an exit level aperture 9A. Just above the bottom exit level 9 is a large exit level 10, shown on FIG. 8. This large exit level 10 has a large exit level aperture 10A.

As best shown on FIG. 14, a lower disc circumferential level 11 is located just above the large exit level 10. This large circumferential level 11 is best shown on FIG. 9.

In order to introduce air at the circumference, a circumferential level having a circumferential level aperture is required. As best shown on FIGS. 11 and 14, a lower disc circumferential level has clockwise air shafts 21 which communicate aerodynamically with the outer case chamber 29. The blower circulates the air down the clockwise airshafs 21 and counter-clockwise airshafts 22. As shown on FIG. 9, air is circulated down through clockwise airshafts 21 and is then blown out through the lower disc circumferential level clockwise airshaft aperture 12. Air blown out through this aperture is blown onto the top surface of the lower disc 6 and the bottom surface of the middle disc 5. The direction of this airflow is best shown on FIG. 6. Once the air is blown through those clockwise shafts 21, it is allowed to exit through the lower disc central apertures 13 and out the bottom and large exit level apertures 9A and 10A respectively. Although air is blown down all four air shafts (21 and 22), the apertures direct the air onto the discs appropriately.

Figure 10:
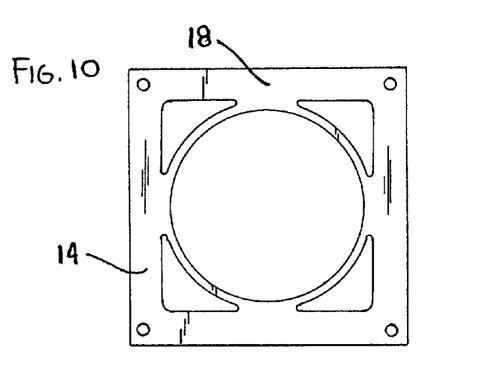
FIG. 10 is a plan view of the sealing-spacer level. This sealing-spacer level is located at two different places along the height of the device.

The areas between the upper surface of the lower disc 6 and the lower surface of the middle disc 5 are isolated by means of spacer-sealing levels. A plan view of two of the spacer-sealing levels 14 and 18 is shown on FIG. 10. It is to be understood that there are a number of sealing levels, at 10, 14 and 18 as shown on FIG. 14. The purpose of these sealing levels is to insure that the circumferential air introduced below each sealing level will flow in the direction of the arrows only.

Spacer-sealers 10, 14 and 18 are contiguous with discs 6, 5, and 4, respectively. These spacer-sealers have top edges and bottom edges aligned with the top edge and bottom edge of the respective discs. An O-ring seal may also be added between each spacer-sealer and disc to insure a tight air seal.

This tight seal is necessary to insure that air introduced onto the top of a disc does not leak to the underneath side of the disc. Such leakage would cancel out the flow differentials created by this device.

Figure 11:
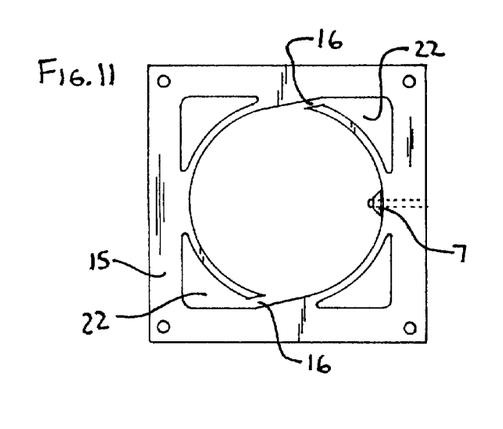
FIG. 11 is a plan view of the middle disc circumferential level showing the counter clockwise air apertures.
Figure 11A:
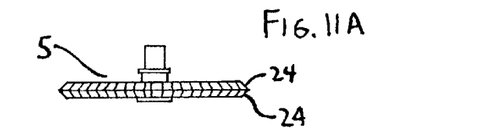
FIG. 11A is a side view oft he middle disc.
Figure 11B:
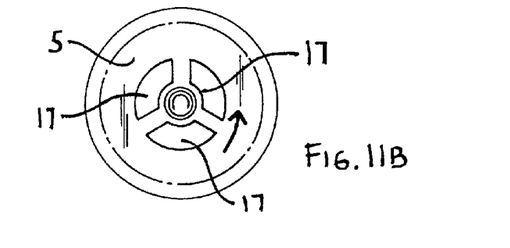
FIG. 11B is a top view of the middle disc shown on FIG. 11A.

Just above the upper surface of the middle disc 5 is a middle disc circumferential level 15, as best shown on FIG. 11. This middle disc circumferential level 15 has middle disc circumferential level counter-clockwise apertures 16. Counter-clockwise airshafts 22, as best shown on FIGS. 1 and 11, feed air through the counter-clockwise airshafts and out the counter-clockwise middle disc circumferential level apertures 16. This counter-clockwise air is fed onto the upper surface of the middle disc 5 and the lower surface of the upper disc 4, as shown on FIG. 6.

The middle disc also has middle disc central aperture 17, to enhance the air flow and exhaust out the central exhaust apertures.

Directly above the middle disc circumferential level 15 is an upper disc spacer-sealing level 18. This upper disc spacer-sealing level 18 has the shape as shown on FIG. 10. It is to be understood that sealing levels 14 and 18 have the same shape but are located at different levels of the disc plenum chamber 28.

Figure 12:
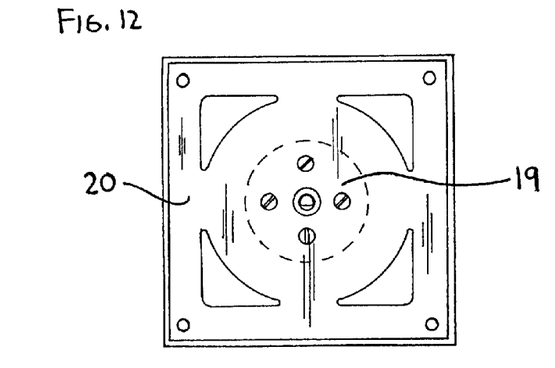
FIG. 12 is a plan view of the disc drive motor level.

The disc drive motor 19 is connected to a final disc drive motor level 20. The disc drive motor level 20 has the shape as shown on FIG. 12.

Just below the disc drive motor level 20 and above the middle disc circumferential level 15 is the upper disc 4. The upper disc 4 is keyed to the drive shaft 26 through key 27. The upper disc is geared and beveled as shown on FIG. 13. The upper disc has a downward bevel 23, which is geardly connected to the reversing gear 7. The mechanical relationship between the upper, middle, and lower discs has been previously described.

Figure 6:
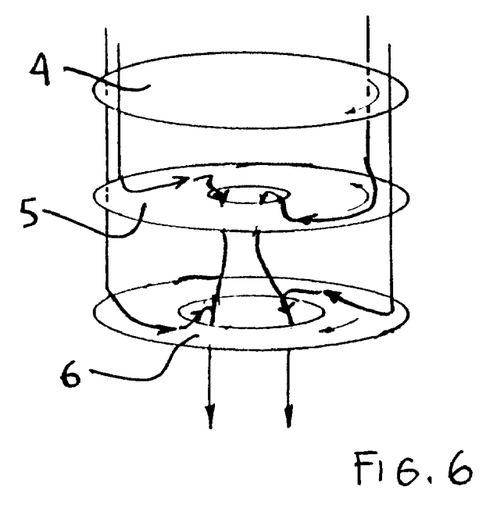
FIG. 6 is a schematic view of the discs showing the rotation of air and the introduction of air at the circumferential edge of the discs.

As shown on FIG. 6, circumferential air is introduced between upper disc 4 and middle disc 5 in a direction opposite the rotation of the middle disc. Circumferential air is introduced between the middle disc 5 and the lower disc 6 in a direction opposite the rotation of the lower disc. This creates a difference in the velocity of the surfaces. The upper surface of each disc thus has a greater flow velocity than the lower surface of that disc. This creates the upward lift for the device.

As best shown on FIGS. 1, 2, 5 and 6, the operation of the device can be readily ascertained. Air is introduced from the inlet port 2 by the blower and is circulated to the clockwise 21 and counter-clockwise 22 airshafts. The upper disc rotates in a clockwise direction while the middle disc rotates in a counter-clockwise direction, as shown on FIGS. 5 and 6. Air is introduced between the upper and middle discs in a clockwise direction.

The middle disc 5 and lower disc 6 are rotating in different directions. However, air is introduced between the middle and lower discs in a counter-clockwise direction. The previously described principles of aerodynamics creates the lift as the discs rotate in opposite directions and as air is introduced in opposite directions at the circumferential edges as previously described.

It is to be understood that O-rings or other seals may be utilized along the edges of the rotating discs to insure that air flow remains as described in the Specification.

The essence of this device is the recognition that counter-rotating discs, having air injected at the circumference as described above, create a large amount of vertical lift. The actual mechanics of driving the counter-rotating discs may be varied while still keeping within the spirit and disclosure of this invention. For example, each alternating disc may be directly driven by a separate motor.

It is also to be understood that the introduction of the air using the disc circumferential level clockwise or counter-clockwise apertures may be varied. For example, air may be introduced by the simple us of air pressure hoses directed at the appropriate circumferential edge of each disc. The preferred embodiment described herein is a functional embodiment but may be varied according to the spirit and disclosure of this invention.

As shown on the Drawing Figures, the upper, middle and lower discs are located in vertical coaxial alignment. The drive shaft is located at the center of the upper disc and the discs are counter-rotated by means of the reversing gears. Successive placement of reversing gears in successive discs results in each disc rotating in a direction opposite from the direction of the disc above and below it. It is to be understood that any number of discs can be utilized in practicing this device while still keeping within the spirit and disclosure herein.

This particular lift device has many practical applications. It could be used to replace helicopter rotor blades or to create a completely encased lift device for a vehicle such as a helicopter. Alternatively, two of these devices located in a perpendicular arrangement to each other could create both lift and propulsion such as is commonly found in airplanes or boats. This device has many useful applications in both the lift and propulsion fields.

Having fully described my device, I claim:

1. A lift device for creating vertical lift for an aircraft or other vehicle, comprising:

(a) a plurality of essentially flat, axially aligned horizontal discs, wherein each disc rotates in a direction opposite from the disc directly above it, and wherein each disc has a central exit aperture;

(b) at least one clockwise air injection means for each disc rotating in a clockwise direction, said clockwise air injection means having an aperture located at the lower circumferential edge of each of said clockwise discs;

(c) at least one counter-clockwise air injection means for each disc rotating in a counterclockwise direction, said counterclockwise air injection means having an aperture located at the lower circumferential edge of each of said counterclockwise discs;

(d) a blower means for forcing air through said clockwise and counterclockwise air injection means;

wherein each disc has air introduced at its lower circumferential edge in the direction of rotation of said disc.

2. A lift device for creating vertical lift for an aircraft as in claim 1, further comprising an outer case having an inlet and outlet exhaust port, enclosing said discs, air injection means and blower means.

3. A lift device for creating vertical lift for an aircraft as in claim 1, wherein said air injection means comprises an airshaft fluidly connected to said aperture.

* * * * *